Feb. 7, 1928.
A. COSTA
1,658,707
SIGNALING DEVICE FOR MOTION PICTURE MACHINES
Filed Oct. 31, 1923  2 Sheets-Sheet 1
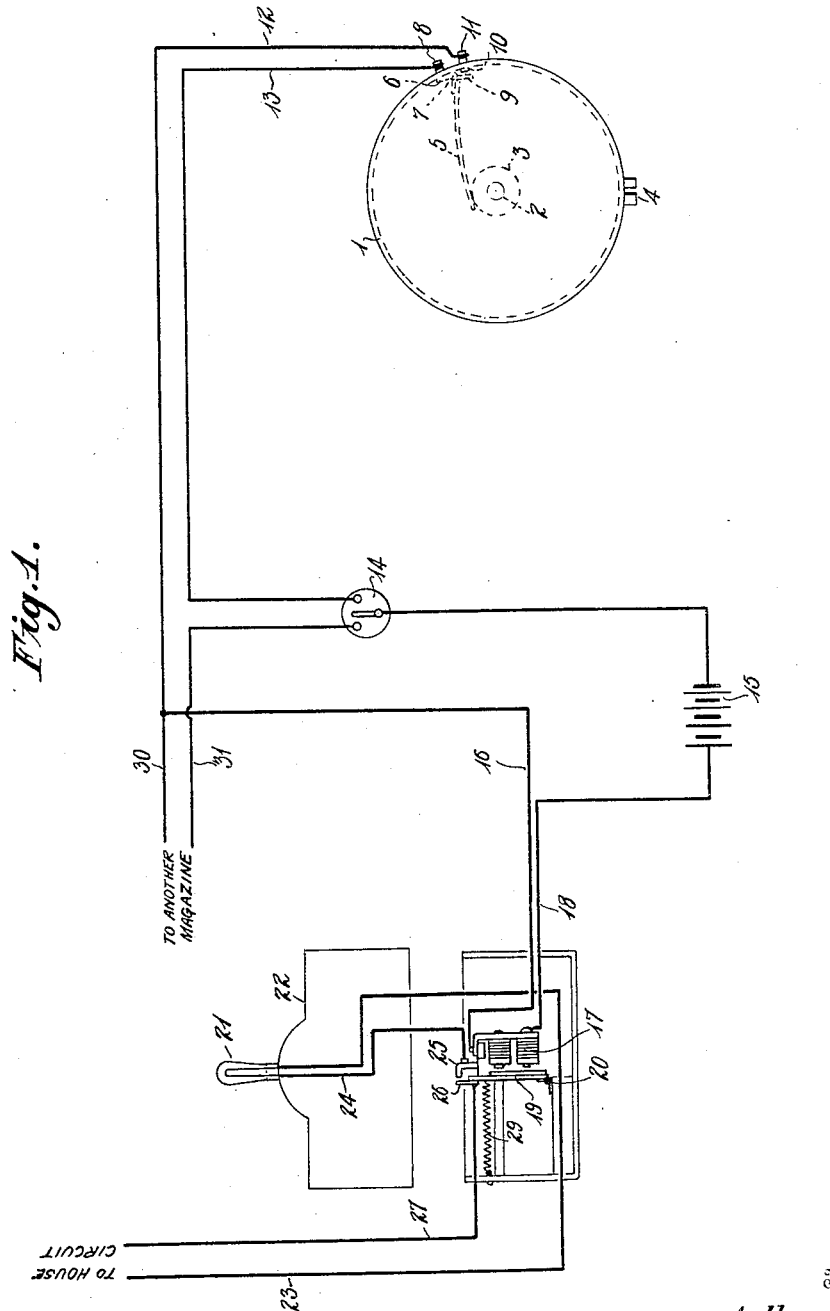
Inventor
Anthony Costa
By Bucen & Thomas
Attorneys Feb. 7, 1928.

A. COSTA 1,658,707

SIGNALING DEVICE FOR MOTION PICTURE MACHINES

Filed Oct. 31, 1923   2 Sheets-Sheet 2

Inventor
Anthony Costa

By Brown & Thomas
Attorneys

Patented Feb. 7, 1928.

1,658,707

UNITED STATES PATENT OFFICE.

ANTHONY COSTA, OF DONORA, PENNSYLVANIA.

SIGNALING DEVICE FOR MOTION-PICTURE MACHINES.

Application filed October 31, 1923. Serial No. 671,897.

The invention relates to improvements in a signaling mechanism for motion picture apparatus.

In the exhibition of motion pictures, it is the custom to employ two motion picture machines so that when the reel from a magazine on one machine has been unwound a second reel can be exhibited without a delay on the other machine. Considerable inconveniences have been encountered in the past by reason of the fact that the operator is not informed and sometimes does not know just when one reel is substantially unwound so as to prepare to use the second machine, the curtain often going entirely blank.

It is an object of this invention to provide a signaling means of a simple and compact construction adapted to give a visible signal when the reel in a magazine is about unwound, thus informing the operator that the film is near an end.

With the foregoing object in mind the invention preferably comprises a signaling mechanism which can be attached with ease to any standard magazine without substantially altering or changing the construction thereof, and which when applied offers no projecting or protruding parts, which impair the operation of the machine.

The invention furthermore contemplates a signaling device wherein a movable flap in the magazine is adapted to throw a switch when the reel is nearing its end to permit current from the usual house wiring to pass through the switch elements and operate a signal such as a light, a bell, or both.

Figure 3:
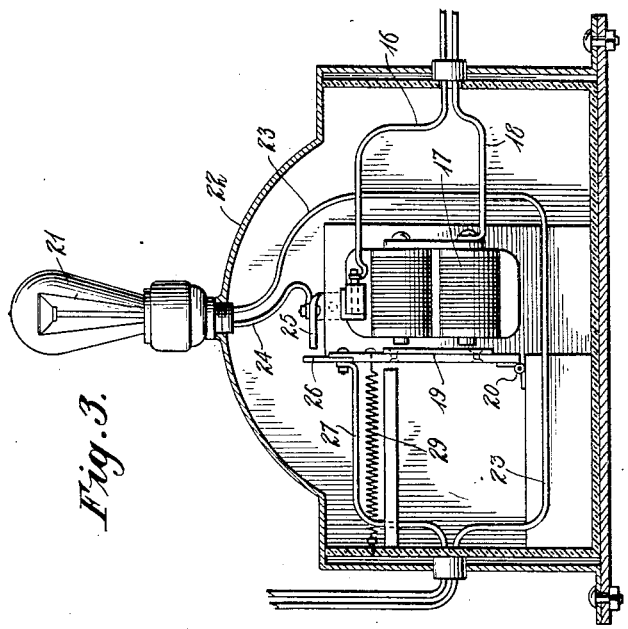
Figure 2:
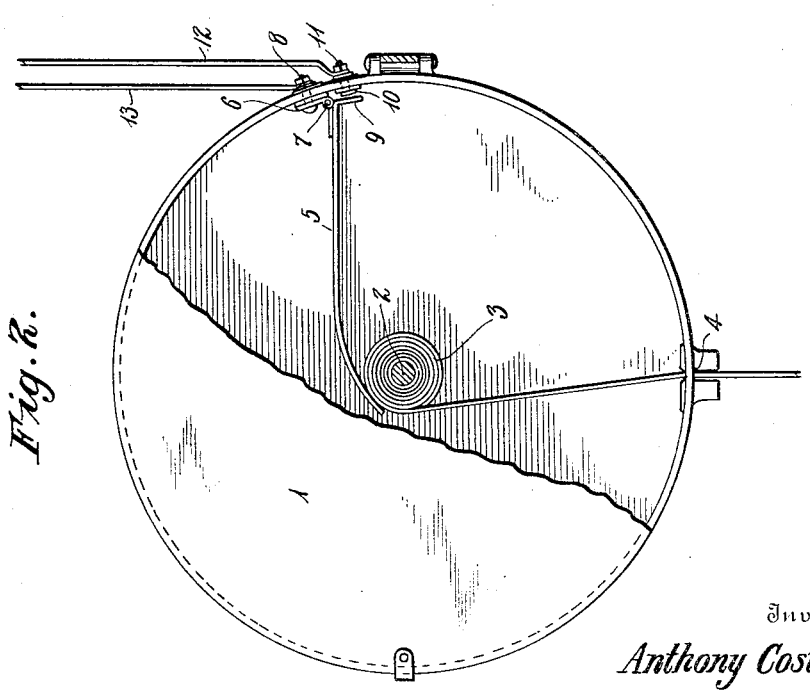

In the accompanying drawings I have shown a preferred embodiment of the invention, in which Figure 1 represents a diagrammatic showing of the device;

Figure 2 is a detail view of the reel with the switch operating mechanism applied; and, Figure 3 is a detail view of the switch mechanism.

Referring now more particularly to the drawings wherein like reference characters indicate corresponding parts, the numeral 1 designates the magazine of a motion picture apparatus. This magazine has the usual film receiving shaft 2 about which a film 3 is wound. The magazine is also formed with the film opening 4 for the exit of the film to pass on to the projecting apparatus. It will be appreciated that in motion picture apparatus it is desirous to give a continuous exhibition and as soon as the film from one machine is unwound it is the practice to use the film from a second and adjacent magazine. It is highly desirable, however, to provide a signal to inform the operator just when a film is nearing its end, as the film is totally enclosed in the magazine and hidden from the view of the operator. This invention comprises a signaling means for accomplishing these ends.

Disposed within the magazine 1 is a circuit controller 5, comprising a pivoted arm attached to a plate 6 by a pivot pin 7, which plate is bolted to the peripheral portion of the magazine 1 by the bolts 8. The plate carries a right angle extension 9, which when in the position shown in Figure 2 is in engagement with the contact 10 bolted in position by the bolts 11 and connected with the wire 12. The plate 6 is connected with a wire 13 in circuit with a battery and a switch in a manner to be later described. As the film is unwound and when it reaches the position shown in Figure 2, a contact is made permitting the current to pass on to a switch mechanism to be now described. A hand operated switch 14 is provided for the purpose of establishing communication between the battery 15 and the wires 12 and 13 when the flap 5 is lowered to a switch making position. Thus, when this flap is lowered the current passes from the pivot through the switch 14 which is thrown to a closed position and remains in such position until otherwise shifted through the line 13, through the line 12, through the line 16 to a series of magnets 17 and thence through the line 18 back to the battery. It is therefore apparent that the magnets 17 are energized and when so energized they attract the armature 19 pivoted at the point 20 to a suitable support and causing a closing of the signaling circuit as will be described.

The signaling mechanism comprises a light 21, or if desirable, a bell can be substituted in lieu thereof or both a light and a bell can be used.

The signaling element is mounted in a casing 22, which casing also houses and supports the magnets 17 and the pivoted armature 19. Any form of casing can be employed as is found most desirable.

The electrical energy for the signaling element 21 may be the usual house current and is, of course, independent and distinct of the current obtained from the battery 15.

The current travels through the line 23, which enters the housing 22, passes through said housing and to the signaling element 21. The circuit is completed by the line 24 which leads to a switch 25 which contacts with the switch 26 on the movable armature 19 when this armature is attracted, the switch 26 being connected with the lead wire 27 leading off to any suitable point of connection.

The armature 19 is maintained normally in an outstanding position by the tension of the spring 29, and is only attracted when the circuit maker 5 in the magazine drops, causing the magnets 17 to be energized and drawing the armature 19 to a closed position. This brings the switch elements 25 and 26 into contact permitting the current to pass to the signaling device 21. This, of course, informs the operator that the reel 3 is substantially at its end and that he must prepare to use the second machine if pictures are to continue to be exhibited. The signaling element may remain lighted until the hinge flap or arm 5 is shifted to break contact with the switch point 10, or the hand switch 14 operated to open the light circuit.

In the drawings I have shown the lead wires 30 and 31 and it will be appreciated that these wires are connected to a second magazine. The mechanical switch 14 is a two way switch so that when a magazine is being used the switch bar is shifted to put this particular magazine in circuit with the battery. As the construction of the second magazine will obviously be the same as that disclosed, a detail description thereof will not be necessary.

Having thus described my invention, what I claim is:

In a device of the type described, a support, a hinge plate carried by and electrically insulated from the support, a controller arm having a hinge plate at one end connected to the former hinge plate by a pivot pin, an electric contact carried by the support below the first-mentioned hinge plate and insulated from the support, a right angular extension carried by the hinged end of the controller arm and adapted to engage and disengage the electric contact when the controller arm is raised and lowered, and circuit wires connected to the hinge plate and contact carried by the support.

In testimony whereof I affix my signature.

ANTHONY COSTA.